Dec. 23, 1969　　　H. E. BERGREN　　　3,485,315
HYDROSTATIC TRANSMISSION AND CONTROLS THEREFOR
Filed Aug. 30, 1967　　　　　　　　　　　　　　4 Sheets-Sheet 1
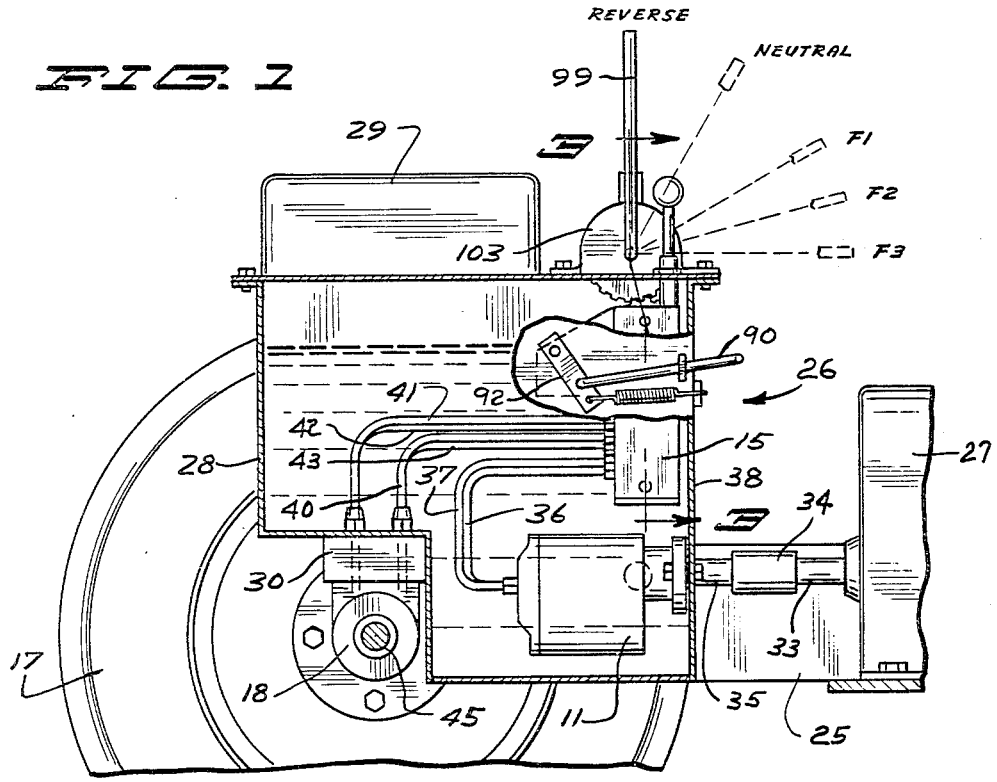
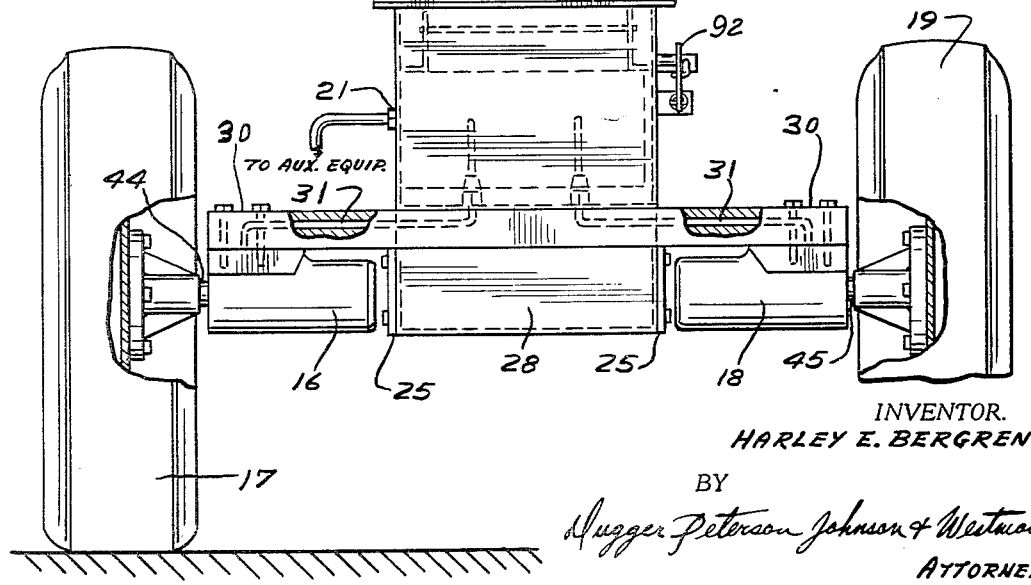
INVENTOR.
HARLEY E. BERGREN
BY
ATTORNEYS

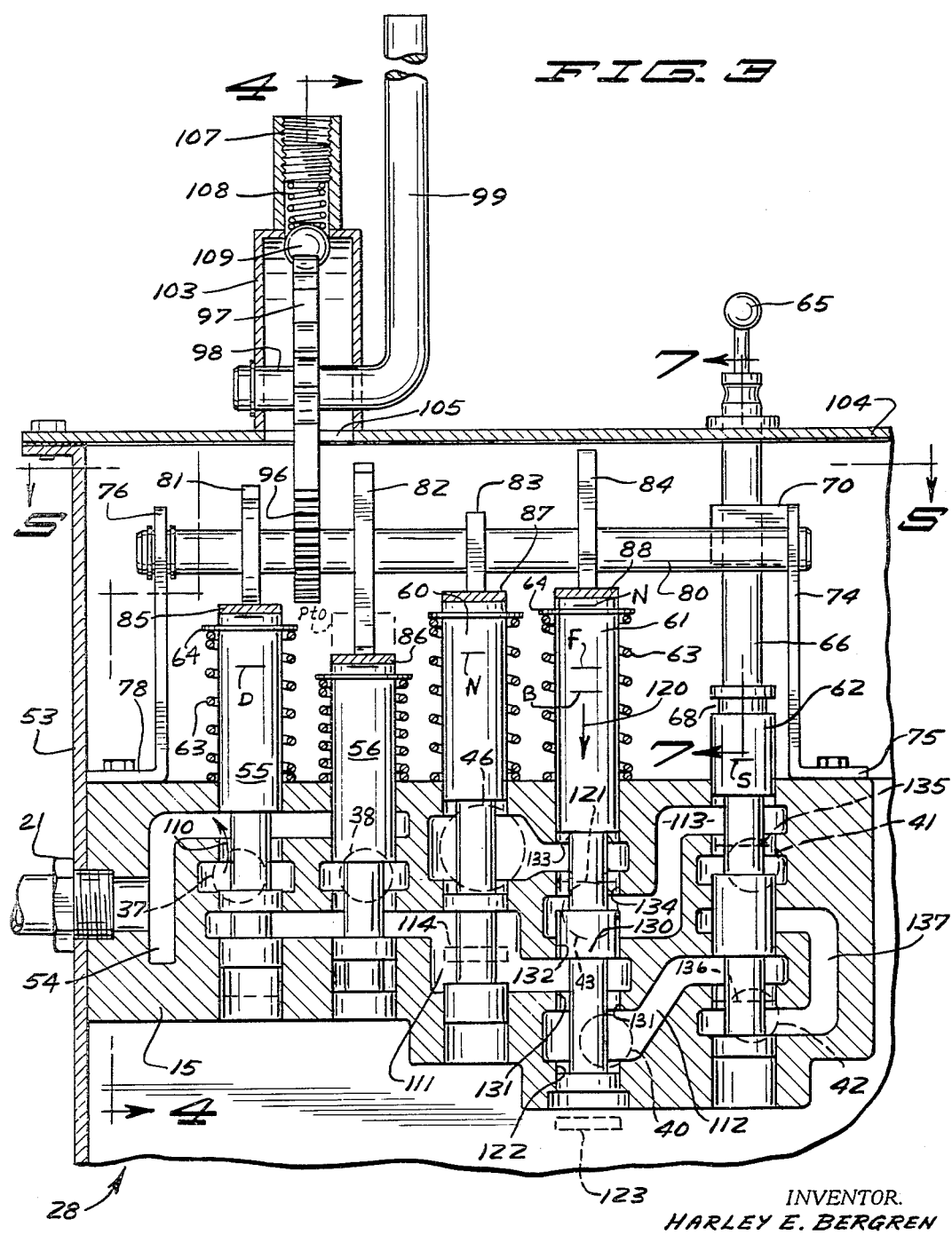

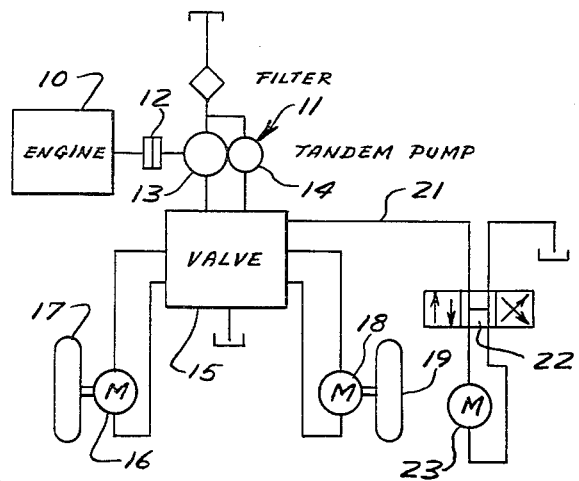
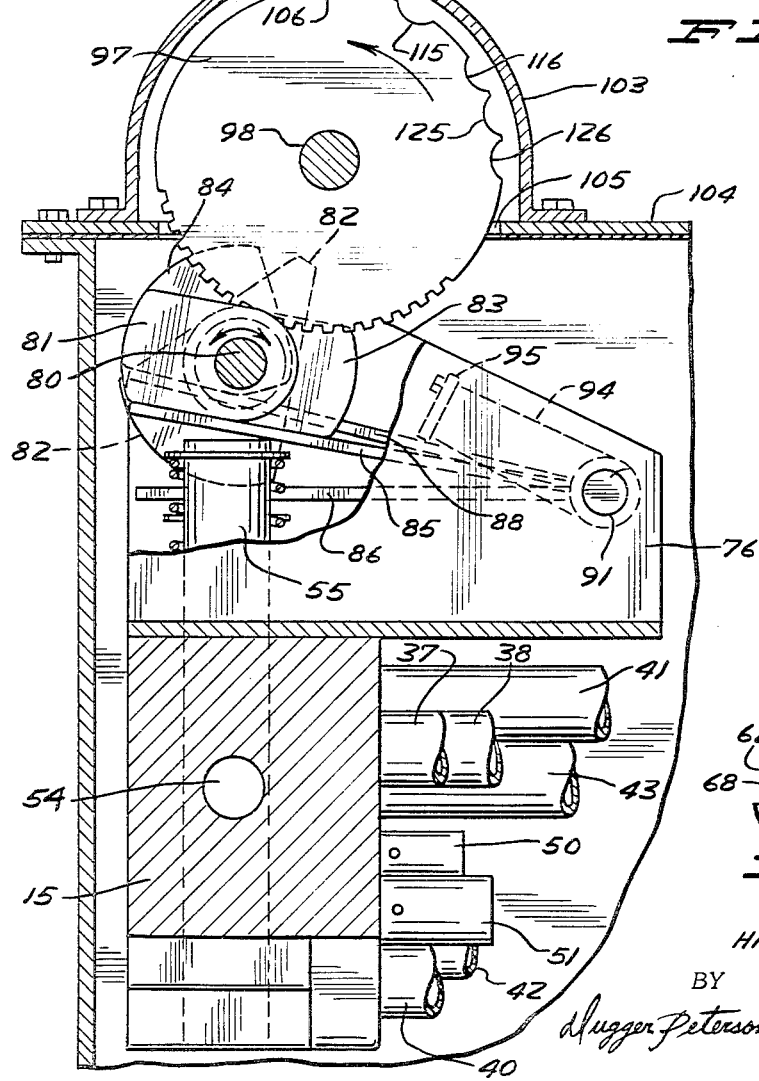
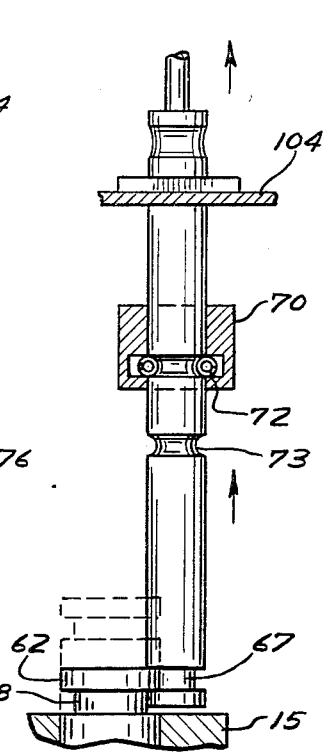
INVENTOR.
HARLEY E. BERGREN

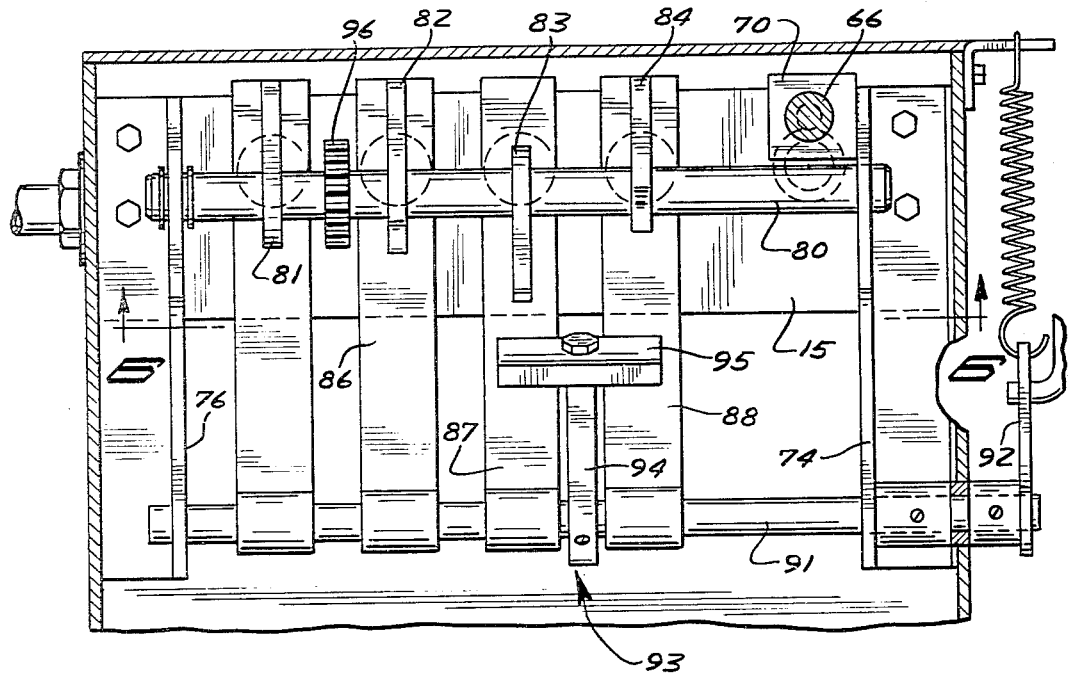
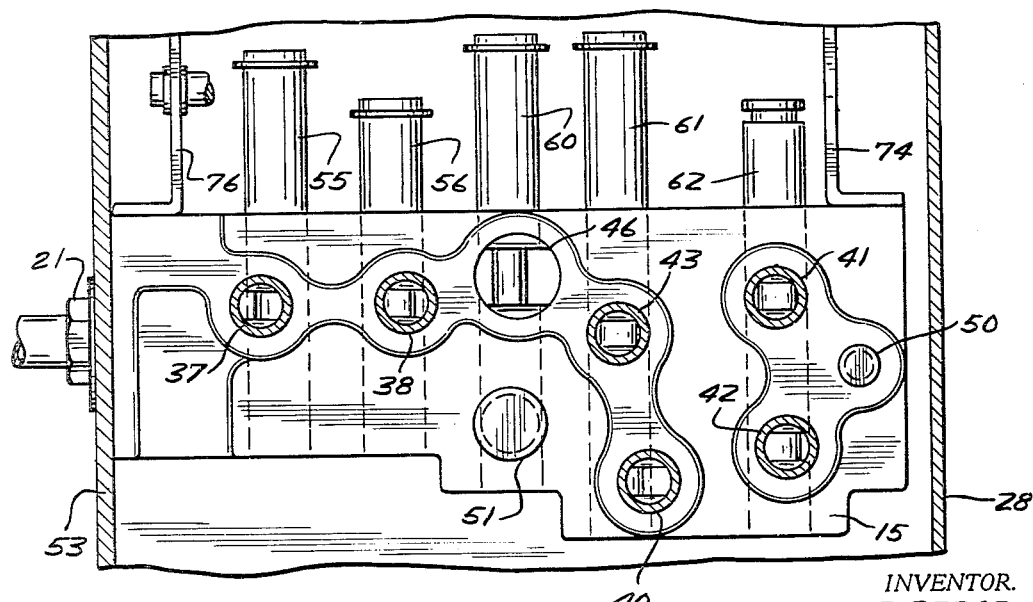

United States Patent Office 3,485,315
Patented Dec. 23, 1969

3,485,315
HYDROSTATIC TRANSMISSION AND CONTROLS THEREFOR
Harley E. Bergren, 4912 Royal Oaks Drive,
Hopkins, Minn. 55343
Filed Aug. 30, 1967, Ser. No. 664,327
Int. Cl. B60k 3/00
U.S. Cl. 180—66          9 Claims

ABSTRACT OF THE DISCLOSURE

A hydrostatic transmission and controls therefor for use on vehicles, primarily vehicles of a garden tractor type. Hydraulic fluid under pressure is used for driving motors to provide the tractive force for the vehicle and a separate hydraulic circuit is used as a power take off for auxiliary equipment. A special unitary valve is provided to utilize the output from a tandem hydraulic pump so that the flow to the driving motors can be varied in accordance with the requirements of the operator. The valve is a specially constructed unit which will divert the flow from the high output section of the tandem pump either to the power take off motors or to the wheel drive motors; will divert the flow from both sections of the tandem pump to the wheel drive motors; or will divert the flow from the small section of the pump to the wheel drive motors or to the power take off. The valve is constructed to operate from a single control lever actuable to a plurality of positions. The valve is contained within the hydraulic reservoir and the supporting axle for the vehicle also has conduits leading to the motors for driving the vehicle defined therein. The motors are mounted right onto the axle and support the sole mounting means for the wheels. The wheel drive motors can be operated in series or in parallel.

BACKGROUND OF THE INVENTION

Field of the invention

The present invention relates to hydrostatic transmission and controls for such transmission in use for propelling vehicles over the ground.

Description of the prior art

In the prior art, there are several forms of hydrostatic transmissions available which use hydraulic motors for propelling the ground drive wheels of the vehicles. However, the units heretofore in use have required a good deal of space, complicated plumbing, and unslightly external valves. The present device utilizes a single control valve body which is mounted inside the hydraulic reservoir. The reservoir also serves as a structural member for the vehicle to be propelled and the support axle for the drive wheels comprises the housing for conduits supplying hydraulic fluid under pressure to the drive motors. In addition, a single control actuator is utilized for controlling forward and reverse drives of the drive wheels as well as the selection of the forward speeds. The unit thus becomes very compact making it suitable for small vehicles such as garden tractors or small industrial units, and makes the design aesthetically pleasing. The unitary control housing consolidates all of the control valves in one easily mounted unit and the controls permit selection of the pump outputs between the provision of greater ground speed or powering remote motors for power take off. The unit has an overriding neutral and brake lever which will permit the quick stopping of the vehicle if necessary.

SUMMARY OF THE INVENTION

The present invention thus provides a hydrostatic transmission and unique controls therefor which permit single lever operation of the transmission, and wherein all of the components necessary for operation of a ground drive vehicle and auxiliary power take off are contained within a single valve. The invention presents a unique way of providing conduits to supply hydraulic motors for wheel drives by providing the conduits in the terminal of a supporting axle for the unit. Other features include an override neutral brake system for providing hydraulic braking and an individual connection for remote hydraulic power for operating attachments or other implements.

BRIEF DESCRIPTION OF THE DRAWINGS

FIGURE 1 is a fragmentary vertical section view of a vehicle having a hydrostatic transmission made according to the present invention;

FIGURE 2 is a rear elevational view of the device of FIGURE 1;

FIGURE 3 is a sectional view of a hydraulic control valve taken as one line 3—3 in FIGURE 1 showing the valve in a reverse position;

FIGURE 4 is a sectional view taken as one line 4—4 in FIGURE 3;

FIGURE 5 is a sectional view taken as on line 5—5 in FIGURE 3;

FIGURE 6 is a sectional view taken as on line 6—6 in FIGURE 5;

FIGURE 7 is a fragmentary sectional view taken as on line 7—7 in FIGURE 3; and

FIGURE 8 is a schematic representation of the hydrostatic transmission and drive system made according to the present invention.

DESCRIPTION OF THE PREFERRED EMBODIMENT

First, referring to FIGURE 8, the schematic representation of a hydrostatic transmission made according to the present invention is illustrated. In FIGURE 8, there is an engine 10 used to drive a tandem (dual output) pump 11 through a suitable power coupling 12. The tandem pump is a fixed displacement pump having two separate outputs running from a common shaft. The tandem pump includes a high flow section 13 and a low flow section 14, both of which feed into a valve 15 which is used for controlling the system. The valve 15 is used to divert flow from either section 13 or 14 to a hydraulic motor 16 used to drive a wheel 17 and another hydraulic motor 18 used to drive a wheel 19. In addition, the valve has means to divert flow from either the high flow section 13 or the flow section 14 or both through a hydraulic power take off line 21 which in turn operates through a separate valve 22 to drive a power take off motor 23 in either direction of rotation.

The main valve 15 is made so that the motors 16 and 18 can be placed in series or parallel and either the output from high flow section 13 or the output section 14, or both, can be diverted to these motors 16 and 18 in order to vary the ground speed of the vehicle. Further, the outputs of either section of the tandem pump can be put through the power take off line 21. The physical embodiment of the control valve 15 and other structural parts are shown in the following figures.

In FIGURE 1, a frame 25 is used to strengthen a ground drive vehicle illustrated generally at 26, such as a small garden tractor or similar vehicle. The frame 25 extends from an engine housing 26 back to a structural housing 28 which forms a hydraulic reservoir and is also used for supporting a seat 29 and to which a rear axle 30 is fixedly attached. The engine 27 has an output shaft 33 drivably coupled with a suitable coupling 34 to a shaft 35 leading to the tandem pump 11. The pump is mounted inside the reservoir 28. The tandem pump 11 has first and second sections, and the first section has a high output, for example ten gallons per minute, while the second section has a lower output, for example five gallons per minute.

The pump 11 has a first pressure line 36 delivering fluid under pressure from the high flow section of the pump and a second pressure line 37 delivering fluid under pressure from the low flow section of the pump. These lines supply the control valve 15. The control valve 15 is mounted onto a front wall 38 of the reservoir 28 and is enclosed within the reservoir. Thus all of the major components for the hydraulic system are located within the reservoir. The valve body 15 contains all of the control spools for the system, with the exception of any auxiliary power take off control valves 22. The lines 36 and 37 are connected to the valve body and will go through suitable passageways which will be more fully explained and in accordance with selection of the operator, fluid under pressure can be directed through conduits 40 and 41, which are connected to the motor 18 for the wheel 19. One conduit is the pressure line to the motor and the other is the return. The valve 15 also controls flow through conduits 42 and 43 which are for the motor 16 which drives the wheel 17. Here too, one conduit is the pressure line in the motor and one is the return. As shown in FIGURE 1, the conduits 40, 41, 42 and 43 are all connected to suitable ports passing through the wall of the reservoir into passageways 31 defined in the axle 30. These passageways are shown in FIGURES 1 and 2. Each passageway 31 forms an extension of one conduit and connects directly to the proper port for the motors 16 or 18. The motors merely sealingly bolt against the axle in alignment with the passageways inside the axle and receive fluid under pressure through the conduits from the valves and through the proper passageways in the axle and also the return passageways for the motors are in the axle 30.

The motor 16 has an output shaft 44 which directly mounts and drives the hub for wheel 17, and the motor 18 has an output shaft 45 which is directly drivably mounted to the hub for wheel 19. Thus, the unit has no external plumbing to the wheel motors 16 and 18. All of the conduits are enclosed either within the axle 30 itself or within the reservoir for the hydraulic system. The hydraulic motors 16 and 18 can be of any suitable or desired design which will give the required amount of torque for the flows and pressures obtainable with the tandem pump 11.

In FIGURE 6, the valve body 15 is shown with the various ports or conduits positioned along with the valves themselves. As can be seen, the conduit 37 opens into the valve adjacent one end thereof and the conduit 38 is positioned right next to it. The conduit 37 leads from the high volume pump or portion of the tandem pump and the conduit 38 leads from the lower volume portion of the tandem pump. A port 46 is open directly to the tank or reservoir and has no conduits connected to it. In addition then, the conduits for the motors are shown at 40, 41, 42 and 43, respectively. A series parallel relief valve 50 is also provided as is a large system relief valve 51.

Referring now to FIGURE 3, a sectional view showing the internal porting of the valve body 15 is shown. In FIGURE 3 the ports in the valve leading to the conduits or ports are shown in dotted lines for illustrative purposes to show the outlet ports with respect to the various passageways in the body. In addition to the conduits already mentioned, there is an internal power take off or auxiliary passageway 54 at one end of the valve body 15 and this passageway passes through a provided opening in the wall 53 of the tank and connects directly to a hydraulic line 21. The line 21 leads to the valve and motor shown schematically. The return line for the motor can discharge back into the tank through any provided opening or with a separate conduit.

Referring again to FIGURE 3, the flow through the conduit or port 37 from the large section of the tandem pump is controlled by a large pump spool valve 55 mounted in a provided bore and movable in axial direction. The flow from the small pump through conduit 38 is controlled by a spool valve 56 which is identically constructed to valve 55. A throttle spool valve 60 is also provided in a bore in the valve and this spool is used for controlling flow either to the power circuits for the drive or else right directly back to the tank. A directional control valve 61 is provided and this is used to reverse direction of the vehicle and also is used for braking the vehicle as will be more fully explained. The last spool used in the valve body 15 is spool 62 and this is termed a "series-parallel spool" which permits the operation of the two motors 16 and 18 either in parallel or in series. The series operation of course gives higher speed and is used mainly for transport of the vehicle itself.

Each of the valves 55, 56, 60 and 61 are provided with springs 63 to bias them in direction away from the valve body. These springs 63 are held in place on each of the valves with suitable washers 64. The series parallel valve 62 is a two position valve controlled through the use of an external control knob 65, attached to an actuator shaft 66 which is axially slidable and has a recess 67 that interlocks with the recess 68 in the directional spool. The control rod 66 is slidably mounted in a bushing 70 that has a garter spring 72 mounted in a provided recess and which grips the control rod in one of two detent positions. The control rod has annular grooves to receive the garter spring. The bushing 70 is mounted onto a suitable support 74 which in turn is attached to the valve body as at 75. The control rod 66 can be slid in either direction axially between the detented positions and in this way pulls the series parallel spool valve along with it to move it between its series or parallel position. The parallel position of the unit is shown in FIGURE 3, while the series position of the spool 62 is shown in FIGURE 7 with the parallel position shown in dotted lines in FIGURE 7.

The support 74 has a mating support 76 attached as at 78 to the opposite end of valve body 15 and these two supports are used for not only mounting the bushing 70 on the support 74 but also for rotatably mounted a cam shaft 80 that extends between the supports in direction alignment with the spools for the valve. The cam shaft 80 mounts cams for operating the valves 55, 56, 60 and 61. A large pump cam 81 is mounted in alignment with the valve 55; a small pump cam 82 is mounted in alignment with the spool 56; a cam 83 is mounted in alignment with the spool 60; and a cam 84 is mounted in alignment with the spool 61. Each of these cams works on a separate cam follower strip 85, 86, 87 and 88, respectively.

The cam follower strips are identically constructed and have hubs which are rotatably mounted over a shaft 91 that is also rotatably mounted in the supports 74 and 76. The shaft 91 is to the rear of the cam shaft 80. The shaft 91 passes out through the side wall of the reservoir and is controlled about its axis through the use of a spring loaded lever 92. The shaft 91 also has an override brake clutch mechanism 93 (FIGURE 5) drivably mounted thereon inside the reservoir and this is the reason for having the control lever 92. The override brake and clutch mechanism 93 includes an arm 94 that is drivably mounted onto the shaft and a cross piece 95 that rides on top of the two followers 87 and 88 for the valves 60 and 61.

It should be remembered that the cam follower strips are rotatably mounted on the shaft 91 so that they move freely under the urging of the respective cams whenever the cam shaft 80 is rotated.

Rotation of the cam shaft 80 is controlled through a pair of spur gears. A small gear 96 is drivably mounted onto the cam shaft 80 between cams 81 and 82 and this engages a large drive gear 97. The drive gear 97 is drivably mounted onto an end portion 98 of a control lever 99 (the control lever is L-shaped). The end portion 98 is rotatably mounted in openings in housing 103 that is mounted on the top of a reservoir cover 104. The reservoir cover 104 has an opening 105 through which a portion of the gear 97 passes so that it can mesh with the gear 96.

The gear 97 is provided with a plurality of ball detent notches at its periphery and which are spaced accordingly to the various positions of the cams desired. The housing 103 has a tube 107 mounted thereon and the tube houses a spring 108 which urges a ball 109 downwardly against the periphery of the gear 97 so that it will react in the detent notches when the notches align with the ball. As shown the ball is in a reverse detent 106.

As shown in the drawings, particularly in FIGURES 3 and 4, the unit is positioned in "reverse." In this position, the cam 81 positions the spool 55 so that flow will come in through the conduit 37 into the valve body and will be permitted to pass into the PTO passageway 54 as shown by the arrow 110. Also, cam 82 is made so that in this position the valve 56 forces flow coming from the conduit 38 to go into the drive circuit passageway 111. It will be seen that the valve spool 60 has lands which keep the passageway 111 sealed so that flow will go to the spool 61 which is in position to cause the flow to move into the conduit 40 which leads to motor 16, and also then through a connecting passageway 112 to the conduit 42 for the motor 18. This is parallel operation of the motors. Both motor conduits are connected to a common source. The motors will then be rotated by the fluid under pressure and fluid will be discharged from the motors through the conduits 41 and 43. The flow from conduit 41 will pass to the valve and through an internal passageway 113 back to the tank port 46 of the valve body and thus be discharged back to the reservoir. The flow from conduit 43 also goes through a bore for spool 61 to the tank port.

When the control lever 99 is moved to the neutral position which is the detent notch 115, the cams are arranged so that the spool 55 stays in its same position, then the spool 56 moves to the position which is equal to the spool 55, in other words, the spool 56 moves to permit flow to go from the conduit into the passageway 54 into the power take off circuit, and the cam 83 is made so that the spool 60 moves to the N position wherein the land indicated at dotted lines at 114 opens up a passageway between the drive circuit 111 and the tank port 46 so that any flow is merely discharged back to the reservoir. However, all of the flow here will be going to the power take off circuit and will be usable for auxiliary equipment. This means the entire fifteen gallons, from both sections of the tandem pump. There will be no drive to the vehicle.

When the unit is moved to the first forward drive position at detent notch 116, the cam 83 will be moved so that the spool 60 again goes to position shown in solid lines in FIGURE 3, the spool 56 moves to position as shown in FIGURE 3, the spool 55 stays in the position shown. The spool 61 moves in direction as indicated by the arrow 120 (F position marked on FIGURE 3 which is the position of the end of the spool) until flow is shut off from the passageway 111 to port 40, but is open up from the passageway 111 to the port 43 and to port 41 through passageway 113 to port 41. At the same time, the main body of the spool 61 moves to position as shown in dotted lines at 121 so that the passageway 113 is shut off from the tank port. Thus the fluid under pressure will flow into the conduits 43 and 41 driving the respective motors and the return from the motors will come in through conduits 42 and 40 through the passageway 112 and out through an open bore indicated at 122. The land at the end of the spool 61 moves to position as shown in dotted lines at 123.

Moving the control lever to the $F_2$ position so that the gear 97 is detented in detent 125 actuating the cams so that spool 56 moves to position wherein the flow from the small section of the pump is directed to passageway 54 (PTO position line) and spool 55 is moved to position wherein the flow from the large section (ten gallons) of the pump goes into the drive circuit 111 (D position line). The directional spool 61 stays in the same position as previously described for forward position (F position line), and the spool 60 stays in the position as shown in solid lines in FIGURE 3. This directs ten gallons per minute flow to the motors 16 and 18 to increase the forward speed. When the control lever is moved so the gear 97 goes to the detent notch 126 ($F_3$), then the flow from both sections of the pump are directed by the spools 55 and 56 into the drive circuit 111 (both spools are at D line position) and then to the motors as previously described for forward direction. The other valves 60 and 61 stay in their positions described for the $F_2$ position.

When using the override braking system, the shaft 91 is rotated with arm 92 and the cross bar 95 depresses the follower strips 87 and 88 so that the valve 60 goes to its neutral position (N line) wherein the land 114 is as shown in dotted lines and the valve 61 is depressed so that a valve land 130 moves down and shuts off flow between the internal bores 131 and 132 of the valve. The main body of the valve 61 moves down to shut off flow between the internal valve lands 133 and 134 (this is B position). This will trap fluid inside the motors and cause the motors to immediately stop. The arm 92 can be controlled with a hand control 90 which is slidably mounted on a wall of the reservoir. The brake control can be attached to a foot pedal if desired. This is an effective brake for locking the wheels.

When the series parallel spool 62 is put in its series position (S line) the valve lands move to position in dotted lines at 135 and 136 in FIGURE 3. Then, for example, if the unit is in reverse as shown in FIGURE 3, the flow goes from conduit 40 to the motor 16 only because passageway 112 is shut off from conduit 42. From the motor, flow returns through conduit 41 and then through a passageway 137 to conduit 42, then to motor 18 and from motor 18 through conduit 43 to the tank port 46 and is discharged. When the vehicle is going in forward direction, the flow is from the drive circuit 111 to conduit 43, to motor 18 (passageway 113 is shut off from conduit 41), then return fluid from motor 18 through conduit 42 and through the passageway 137 to the conduit 41 to motor 16 and then return from motor 16 through conduit 40 and out opening 122 which is formed when the spool 61 is in the forward position.

Thus, a single valve body houses all of the controls necessary to get three selected forward speeds from a hydrostatic transmission using a tandem pump only plus a transport speed when the motors for driving the wheels are placed in series to double the speed in any one of the three normal positions. Further, a safety brake is provided which will override the drive positions regardless of the positions of the normal control lever. The additional feature of having no external plumbing to the drive circuit, or in other words using the structural axle for providing the conduits to the motors, and mounting the drive wheels right on the motor shafts decreased the cost of the unit, makes it much more compact, and eliminates external hoses or hydraulic lines.

What is claimed is:

1. A hydrostatic transmission for vehicles comprising fixed displacement pump means for supplying two separate flows of fluid under pressure, fixed displacement fluid motor means, drive and support wheel means for the vehicle, means to drivably mount said motor means to drive said drive and support wheel means, a unitary valve assembly having a plurality of individually actuated valve spools and passage means open to said valve spools to direct either of said separate flows or both of said separate flows to said motor means, a single actuating shaft rotatably mounted on said valve assembly, a plurality of cam means on said actuating shaft, one for each of said valve spools, said cam means being operable to actuate said valve spools sequentially as said actuating shaft is rotated, and control handle means movable about a single axis to move said single actuating shaft about its axis, said cam means actuating said valve spools within said unitary valve assembly to direct flow from either of said separate flows or from both of said separate flows to said motor means upon movement of said single control handle about its single axis.

2. The combination as specified in claim 1 wherein said valve assembly and said pump means are mounted within a common fluid reservoir.

3. The combination as specified in claim 2 wherein there are two of said fluid motor means and wherein said unitary valve assembly includes a valve spool movable to position wherein said motor means are operated in parallel and movable to a second position wherein said motor means are operated in series, regardless of the position of said single control handle.

4. A hydrostatic transmission for vehicles comprising fixed displacement pump means for supplying two separate flows of fluid under pressure, fixed displacement fluid motor means, drive and support wheel means for the vehicle, means to drivably mount said motor means to drive said drive and support wheel means, a unitary valve assembly having valve spool means and passage means to direct the flow from either of said separate flows or from both of said separate flows to said motor means, a single control handle movable about a single axis, cam means operable by said single control handle to actuate valve spool means within said unitary valve assembly to direct flow from either of said separate flows or from both of said separate flows to said motor means upon movement of said single control handle about its single axis, and a separate passageway in said unitary valve assembly adapted to be connected to auxiliary equipment controls, said cam means being operable on valve spool means to direct flow from either of said separate flows of fluid to said passageway adapted to be connected to auxiliary equipment controls.

5. The combination as specified in claim 4 and further passageway means in said unitary valve body, said further passageway means being connected to the valve spool means to direct flow from both of said separate flows to said passageway adapted to be connected to auxiliary equipment controls.

6. A hydrostatic transmission for vehicles comprising fixed displacement pump means for supplying two separate flows of fluid under pressure, fixed displacement fluid motor means, drive and support wheel means for the vehicle, means to drivably mount said motor means to drive said drive and support wheel means, a unitary valve assembly having valve spool and passage means to direct the flow from either of said separate flows or from both of said separate flows to said motor means, a single control handle movable about a single axis, cam means operable by said single control handle to actuate valve spool means within said unitary valve assembly to direct flow from either of said separate flows or from both of said separate flows to said motor means upon movement of said single control handle about its single axis, said cam means being mounted onto a single cam shaft rotatably mounted on said unitary valve assembly, a first gear drivably mounted on said cam shaft, a second gear rotatably mounted on said vehicle and drivably engaging said first gear, said single control handle being drivably connected to rotate said second gear upon movement of said handle about its axis.

7. The combination as specified in claim 6 and a fluid reservoir, said valve assembly and pump means being mounted inside said reservoir, a second shaft rotatably mounted substantially parallel to and spaced from said cam shaft, a plurality of flat strip like members rotatably mounted on said second shaft and positioned between said cam means and the corresponding valve spool means, and an actuating arm drivably mounted on said second shaft and having means adapted to simultaneously contact two follower strips independently of said cam means, and means external of said reservoir for rotating said second shaft to move said arm and the strip like members actuated thereby to position wherein the valve spool means actuated by the strips block flow to or from said motor means.

8. A hydrostatic transmission for vehicles comprising fixed displacement pump means for supplying two separate flows of fluid under pressure, two fixed displacement fluid motor means having fluid pressure and return ports, respectively, a fluid reservoir mounted on the vehicle, an axle member fixedly attached to said reservoir, said fluid motor means being mounted to opposite ends of said axle member, means between said fluid motor means and separate drive wheel means to drive a separate drive wheel means from each of said fluid motor means, a unitary valve assembly having valve spool and passageway means to direct flow from either of said separate flows or from both of said separate flows to said fluid motor means, separate pressure and return axle fluid passageway means defined within said axle for each of said motor means and leading to the respective motor means, said pressure and return ports of said respective motor means aligning with and opening to the respective pressure and return axle fluid passageway means, conduit means connecting each of said axle fluid passageway means to respective passageway means in said unitary valve assembly, a single control handle movable about a single axis, cam means operated by said single control handle to actuate said valve spool means within said unitary valve assembly to direct flow from either of said separate flows or from both of said separate flows through fluid passageway means to said pressure ports on said motor means upon movement of said single control handle about its axis, means to mount said unitary valve assembly and said pump means within said fluid reservoir, and said unitary valve assembly including a valve spool movable to a first position wherein said fluid motor means are fluidly connected in parallel, and movable to a second position wherein said fluid motor means are fluidly connected in series, regardless of the position of said single control handle.

9. The combination as specified in claim 8 wherein said motor means have output shafts and wherein said drive wheels are drivably mounted on the output shafts.

References Cited

UNITED STATES PATENTS

| | | | |
|---|---|---|---|
| 732,908 | 7/1903 | Thomson | 180—66 X |
| 1,365,541 | 1/1921 | Rankin | 137—637 |
| 2,060,220 | 11/1936 | Kennedy | 180—66 X |
| 2,337,659 | 12/1943 | Hughey et al. | 137—637.1 |
| 2,403,924 | 7/1946 | Herman et al. | 60—53 X |
| 2,438,686 | 3/1948 | Stone | 60—53 X |
| 2,681,117 | 6/1954 | Marcey | 180—66 |
| 2,789,648 | 4/1957 | Huffman | 180—66 |
| 3,192,859 | 7/1965 | Bovee | 60—53 X |
| 3,250,340 | 5/1966 | Roberson | 180—66 X |

FOREIGN PATENTS 920,473   3/1963   Great Britain.

LEO FRIAGLIA, Primary Examiner

M. L. SMITH, Assistant Examiner

U.S. Cl. X.R.

60—53; 137—565, 596.2, 637.1

PO-1050
(5/69)

UNITED STATES PATENT OFFICE
CERTIFICATE OF CORRECTION

Patent No. 3,485,315　　　　　　　　Dated December 23, 1969

Inventor(s) Harley E. Bergren

It is certified that error appears in the above-identified patent and that said Letters Patent are hereby corrected as shown below:

Column 2, line 48, after "the" (second occurrence), insert --low--; line 55, after "output" insert --flow--. Column 6, line 12, "values" should be --valves--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents